US012805449B2

(12) United States Patent
Spieker

(10) Patent No.: US 12,805,449 B2
(45) Date of Patent: Nov. 24, 2026

(54) BINDING NEEDLE FOR A NEEDLE YOKE OF A BALE PRESS

(71) Applicant: MASCHINENFABRIK BERNARD KRONE GMBH & CO. KG, Spelle (DE)

(72) Inventor: Joerg Spieker, Mettingen (DE)

(73) Assignee: MASCHINENFABRIK BERNARD KRONE GMBH & CO. KG, Spelle (DE)

( * ) Notice: Subject to any disclaimer, the term of this patent is extended or adjusted under 35 U.S.C. 154(b) by 0 days.

(21) Appl. No.: 18/823,706

(22) Filed: Sep. 4, 2024

(65) Prior Publication Data

US 2025/0089623 A1 Mar. 20, 2025

(30) Foreign Application Priority Data

Sep. 6, 2023 (DE) ..................... 10 2023 124 000.5

(51) Int. Cl.
*A01F 15/14* (2006.01)

(52) U.S. Cl.
CPC .................................. *A01F 15/145* (2013.01)

(58) Field of Classification Search
CPC ........ A01F 15/145; A01F 15/12; A41D 59/06
USPC ............................................................ 289/16
See application file for complete search history.

(56) References Cited

U.S. PATENT DOCUMENTS 274,909 A * 4/1883 Clow ....................... B65B 13/18 56/448
661,779 A * 11/1900 Vollmers ................ A01D 59/06 289/16
691,240 A * 1/1902 Caudry ................... B65B 13/08 289/16
2,589,083 A * 3/1952 Hill ......................... A01F 15/14 100/21
3,211,083 A * 10/1965 Ralston ................... A01F 15/12 100/24
3,211,084 A * 10/1965 Barfield .................. A01F 15/12 100/24
3,247,780 A * 4/1966 Gholson ................. A01F 15/14 100/24
4,102,260 A 7/1978 White
4,463,668 A * 8/1984 Jackson .................. A01F 15/14 100/24
5,797,961 A * 8/1998 Smith .............. A61B 17/06066 112/222
7,854,195 B2 * 12/2010 Van Groenigen ....... A01F 15/14 56/343

(Continued)

FOREIGN PATENT DOCUMENTS

EP 3 646 720 A1 5/2020

*Primary Examiner* — Bao-Thieu L Nguyen
(74) *Attorney, Agent, or Firm* — Norman B. Thot

(57) ABSTRACT

A binding needle for a needle yoke of a bale press. The binding needle includes a mounting element which mounts to a rocker support of the needle yoke, a guide element which at least indirectly guides a strand-shaped binder, and a needle body which is made of a metal. The needle body is at least partially formed by a pipe profile which defines a profile interior. The needle body is arranged to extend from the mounting element to the guide element and to run at least in sections in a manner of an arc along a plane of curvature so as to define an inside of the arc and an outside of the arc.

17 Claims, 9 Drawing Sheets

(56) References Cited

U.S. PATENT DOCUMENTS

| | | | | |
|---|---|---|---|---|
| 2008/0190306 | A1* | 8/2008 | Rotole | A01F 15/12<br>100/24 |
| 2009/0007805 | A1* | 1/2009 | Van Groenigen | A01F 15/14<br>56/343 |
| 2012/0090274 | A1* | 4/2012 | Reijersen Van Buuren | B65B 27/125<br>53/461 |
| 2015/0097370 | A1* | 4/2015 | Schumacher | A01F 15/145<br>289/1.5 |
| 2016/0021826 | A1* | 1/2016 | Keller | A01F 15/04<br>56/432 |
| 2016/0021828 | A1* | 1/2016 | O'Donnell | B65B 27/12<br>56/432 |
| 2016/0128280 | A1* | 5/2016 | Demulder | A01F 15/14<br>100/24 |
| 2018/0036830 | A1* | 2/2018 | Kokubo | F16L 9/17 |
| 2018/0116123 | A1* | 5/2018 | Chaney | A01F 15/12 |
| 2019/0133047 | A1* | 5/2019 | Brown, Jr. | A01F 15/145 |
| 2020/0137956 | A1* | 5/2020 | Roth | A01F 15/12 |
| 2021/0000016 | A1* | 1/2021 | Hallale | A01F 15/04 |
| 2021/0000017 | A1* | 1/2021 | Hallale | A01F 15/071 |
| 2025/0113777 | A1* | 4/2025 | Horst | A01F 15/10 |

* cited by examiner

BINDING NEEDLE FOR A NEEDLE YOKE OF A BALE PRESS

CROSS REFERENCE TO PRIOR APPLICATIONS

Priority is claimed to German Patent Application No. DE 10 2023 124 000.5, filed Sep. 6, 2023. The entire disclosure of said application is incorporated by reference herein.

FIELD

The present invention relates to a binding device for a needle yoke of a bale press, to a bale press, and to a method for producing a binding needle for a needle yoke of a bale press.

BACKGROUND

Bale presses are used in agriculture to compress crops such as hay or straw which have previously been picked up into bales. The crop is usually picked up from the ground via a pick-up which is integrated into the bale press. In the case of a square bale press, the collected crop is compressed in two stages. The crop is first taken from the pick-up and, if necessary, is cut by a cutting device, is conveyed further by a conveyor and/or collecting device within a collecting chamber, and is thereby shirred and/or pre-compacted. A compression chamber or a bale chamber is arranged downstream of the collecting chamber. An oscillating bailing ram there acts on the crop and carries out the actual compression. Pre-compacted crop is thus transferred in portions into the bale chamber, where the square bale is successively built up.

When the square bale has reached an intended size, the square bale is bound using a binding material or binder before being ejected. The binder can, for example, be a thermoplastic tape or a yarn. In the case of a single knotter, for example, a known binding process involves an end section of the binder being held at one end of the bale on its upper side, with the binder strand being guided along the upper side to the opposite end, then downwards and then back in the opposite direction underneath the bale. A subsequent section of the binder strand is guided by a binding needle. A plurality of binding needles are thereby attached to a needle yoke which is movable relative to the bale chamber. Towards the end of the bale formation, the binding needle guides the strand section upwards through the bale chamber, where it can be connected to the end section mentioned above. Other types of binding processes are also known, although a needle yoke with binding needles is always used to guide binders through the bale chamber. The needle yoke must be moved quickly due to short cycle times and the sometimes considerable height of the bale chamber (for example, between 70 cm and 130 cm). The binding needles are accordingly exposed to considerable acceleration forces and associated bending moments. Each individual binding needle must be sufficiently stable and rigid to withstand the acceleration forces and the associated bending moments. Each individual binding needle must also be comparatively narrow due to the available installation space and should have the lowest possible mass to minimize the inertia of the needle yoke. Known binding needles are, for example, formed from a number of sheet metal parts that are joined together by welding. The production and welding of the individual parts is, however, complex and each weld seam causes thermal deformations that must subsequently be straightened.

SUMMARY

An aspect of the present invention is to provide a binding needle that can be produced efficiently.

In an embodiment, the present invention provides a binding needle for a needle yoke of a bale press. The binding needle includes a mounting element which is configured to mount to a rocker support of the needle yoke, a guide element which is configured to at least indirectly guide a strand-shaped binder, and a needle body which is made of a metal. The needle body is at least partially formed by a pipe profile which defines a profile interior. The needle body is arranged to extend from the mounting element to the guide element and to run at least in sections in a manner of an arc along a plane of curvature so as to define an inside of the arc of the binding needle and an outside of the arc of the binding needle.

BRIEF DESCRIPTION OF THE DRAWINGS

The present invention is described in greater detail below on the basis of embodiments and of the drawings in which.

DETAILED DESCRIPTION

Figure 1:
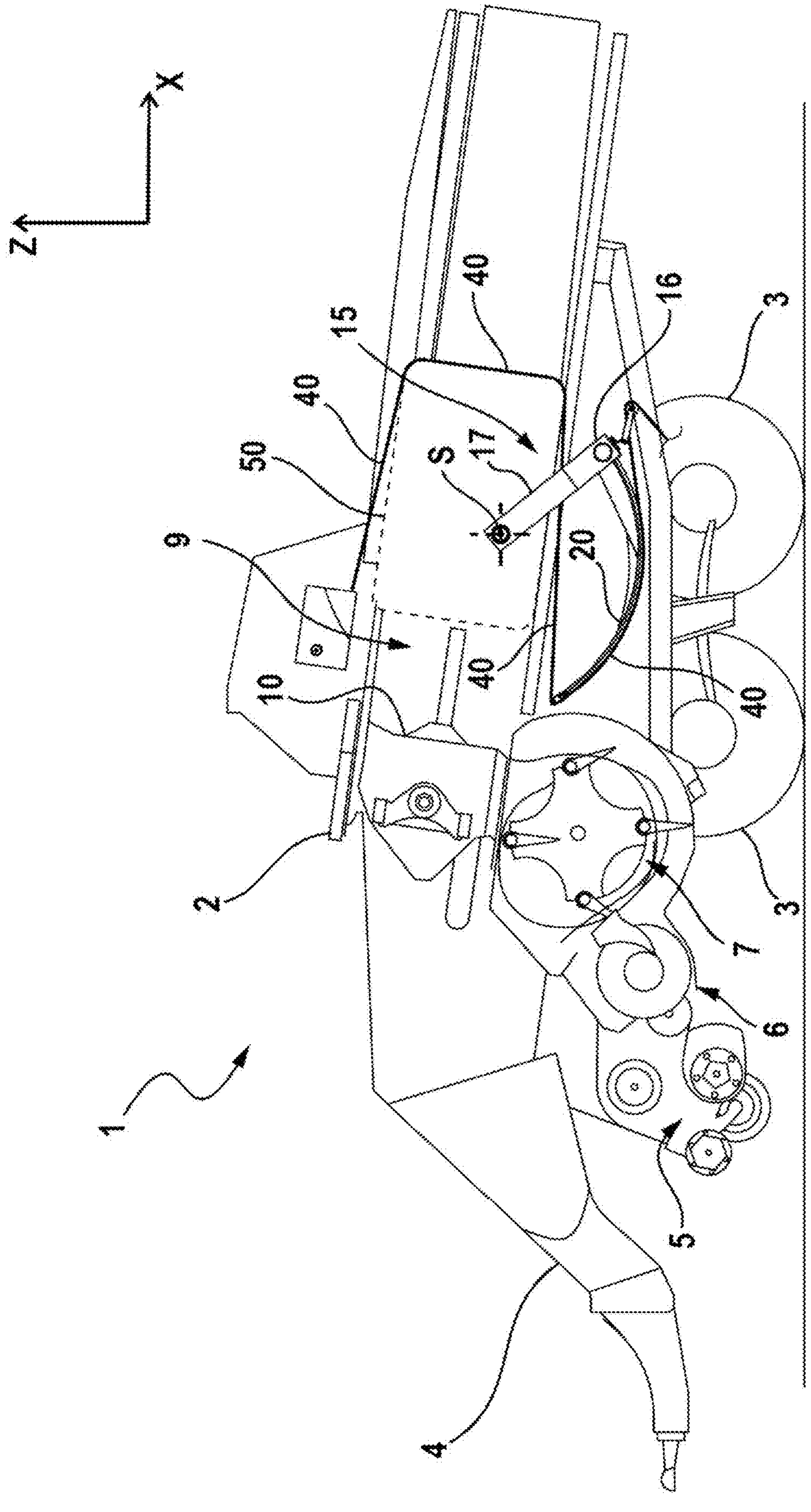
FIG. 1 shows a side view of a bale press according to the present invention in a partial sectional view.

The present invention provides a binding needle for a needle yoke of a bale press, the binding needle having a mounting element for mounting to a rocker support of the needle yoke, a guide element for at least indirectly guiding a strand-shaped binder, and a needle body made of metal which extends from the mounting element to the guide element and runs at least in sections in an arch-like manner along a plane of curvature, thereby defining an inside of the arc and an outside of the arc of the binding needle.

The bale press can in particular be an extrusion press such as a square bale press, a high-pressure baler, or a large square baler. The bale press can be self-propelled with its own drive or as a trailer without its own drive, or be stationary. The bale press has a bale chamber in which the actual bale forming and pressing process takes place. The bale chamber has a longitudinal channel axis to which it normally runs at least predominantly parallel. The longitudinal channel axis can coincide with a longitudinal axis of the bale press, however, the longitudinal channel axis can also be inclined in relation thereto. A bailing ram is typically arranged in the bale chamber which is set up to act on the crop via an oscillating movement and thereby compress the crop. With regard to the crop flow, a collecting chamber is usually arranged upstream of the bale chamber in which a conveyor or collecting device is set up to convey the crop further and to thereby pre-compact the crop.

A binder is provided inside the bale chamber in order to secure the shape of the finished bale. The binder, which can also be referred to as a binding material, can in particular be a yarn (for example, made from a natural fiber such as sisal or a plastic such as PP) or a thermoplastic tape (for example, made of PET). The binder is usually placed around the bale in a plurality of separate loops spaced transversely to the longitudinal channel axis. The loops are closed by knotting in the case of yarn and by welding in the case of a thermoplastic tape. The crop bale is in either case wrapped with the binder. A section of the strand-shaped binder must thereby be fed into the bale chamber and, in particular, through the bale chamber, after which a connection can be made with another section of strand-shaped binder. The binder is introduced or fed through by a needle yoke which has a plurality of binding needles. A separate binding needle is generally provided for each loop so that the needle yoke can have a corresponding number (for example, between two and eight) of binding needles. The needle yoke itself can, for example, be pivotable about a swing axle that runs parallel to the transverse axis of the bale press. The movement of the individual binding needles accordingly also corresponds to a pivoting process.

The binding needle has a mounting element for mounting to a rocker support of the needle yoke. The rocker support can extend parallel to the swing axle and can be used to connect all the binding needles. The rocker support can be spaced from the swing axle and can be connected to rocker arms that extend to the swing axle. The mounting element is attached to the rocker support when mounted either detachably or non-detachably. If a detachable mounting is provided, the mounting element can have a plurality of holes to accommodate fasteners such as screws. The mounting element provides the connection to the rocker support and must therefore be sufficiently stable. The mounting element can, for example, be made of metal, in particular of steel. The mounting element can also be referred to as a foot element or needle foot.

The binding needle also has a guide element for at least indirectly guiding the strand-shaped binder. As already mentioned above, the binder can be guided not only into the bale chamber, but also therethrough to the opposite side, usually the top. The binding needle is in contact with the binder via the guide element. The guide element can guide the binder directly in the operating state, i.e., be in direct contact with the binder. The guide element can, however, also guide the binder indirectly via an intermediate element. Such an intermediate element can, for example, be a guide roll over which a binder strand runs and which is rotatably mounted on the guide element. The guide roll can also be considered as part of the guide element. The guide element can in this respect also consist of a plurality of individual parts. The guide element can in particular be set up to form a positive fit with the binder on both sides in the direction of the swing axle so that its position is thereby fixed. At least a partial positive fit transverse to the swing axle is, however, additionally also necessary to guide the binder into and/or through the bale chamber. The guide element can be at least partially made of metal, in particular of steel. The aforementioned guide roll can, however, for example, also be at least partially made of plastic.

The binding needle also has a needle body made of metal which extends from the mounting element to the guide element and which runs at least in sections in an arch-like manner along a plane of curvature, thereby defining an inside of the arc and an outside of the arc of the binding needle. The needle body can in particular be made of steel, although other metals and alloys are not in principle excluded. The needle body extends from the mounting element to the guide element. The needle body accordingly connects the aforementioned elements. The needle body can form the predominant part of the binding needle in terms of its dimensions and possibly also its mass. An essential function of the needle body is to connect the guide element to the mounting element and thus also to the rocker support. This means that the movement of the rocker support is transmitted to the guide element and then to the binder via the needle body. The needle body can overall be described as being elongated. The needle body is, however, at least not straight throughout, but instead runs at least in sections in an arch-like manner along the plane of curvature. It is therefore possible to identify a plane, referred to here as the plane of curvature, along which the needle body is aligned. This plane runs perpendicular to the swing axle when mounted. "Arch-like" can in particular mean that the needle body is curved so that a radius of curvature can be assigned, at least locally. "Arch-like" would, however, also include a sequence of sections of the needle body that are angled towards each other, resulting in an overall arch-like shape, although each section is straight in itself and there is no radius of curvature or only an extremely small radius of curvature between two sections. It can also be said that the needle body has at least one arc section within which it runs in an arch-like manner along the plane of curvature. The arch-like shape in particular allows the needle body to move through a spatially limited area when the needle yoke is pivoted. Collisions with parts of the bale press and/or with the crop bale can thus be prevented. The needle body can run tangentially to the swing axle at least in sections when mounted. The arch-like shape allows an outside of the arc to be defined, which is referred to here as the outside in this context, and an inside of the arc to be defined, which is referred to here as the inside in this context. When mounted, the inside can, for example, face the swing axle, while the outside can, for example, face away from the swing axle.

The present invention provides that the needle body is at least partially formed by a pipe profile which defines a profile interior. The needle body may in particular be formed within an arc section by the pipe profile. The pipe profile may also be referred to as a hollow profile, a tube or a profiled tube, whereby the term "profile" is to be understood generally and does not refer to a specific type of profile or cross-section. The cross-section of the pipe profile can be the same throughout, but it can also be designed differently in some areas. The pipe profile can, for example, be manufactured in one piece, i.e., the pipe profile consists of a single piece of metal which can be produced from a semi-finished product by one or more forming processes and, if necessary, separation processes. The pipe profile can, for example, be at least partially produced by cold forming. The pipe profile defines a profile interior, i.e., it limits the corresponding interior all-around the edges. The profile interior can, for example, be empty (apart from any air contained therein), however, it is also conceivable that the profile interior be filed, for example, with a polymer foam.

The design as a pipe profile allows for a high stability, which is essential for the transmission of forces and torques between the rocker support and the binder guided by the guide element, while the mass can be kept low, which is advantageous for a dynamic movement of the needle yoke. There are also particular advantages with regard to the manufacture of the needle body. As described, the pipe profile can be brought into the desired shape by forming, whereby the pipe profile already has good stability due to its structure. There is no need in this respect for separating and joining processes (cutting, punching, welding, riveting, etc.) which would be necessary, for example, to form the needle body from individual sheet metal parts. This simplifies production and also minimizes waste. The problem of thermal deformation that occurs when welding individual metal parts is also at least significantly reduced because the needle body can be manufactured without welding.

The needle body can be formed in sections, for example, by a U-profile, a solid element, or other elements. The needle body can, for example, be formed entirely by the pipe profile. The needle body can therefore be manufactured entirely from a single piece, for example, by forming and possibly trimming a semi-finished product. The above-mentioned advantages with regard to the manufacturing process are thus utilized to the maximum.

One embodiment of the present invention provides for the pipe profile to have a receiving section with a concave cross-section on the outside at least in sections which defines a receiving trough for binders on the outside. The cross-sectional plane runs perpendicular to the plane of curvature and in particular perpendicular to the local direction of the pipe profile. A concave receiving section is formed on the outside. “Concave” means that the pipe profile recedes inwards towards the profile interior. A depression is there accordingly formed which is shaped like a channel. This receiving trough extends along the outside and is intended to receive a section of the strand-shaped binder. While a collision between the binding needle and the crop bale or other parts of the bale press can be avoided, it is often unavoidable that the binder comes into contact with the needle body during a binding cycle. The binder strand can in this case lay itself in the receiving trough in a controlled manner instead of, for example, sliding sideways off the needle body and possibly being damaged further down the line. The receiving section and the receiving trough can, for example, be designed at least adjacent to the guide element. The receiving trough can also extend along the entire pipe profile, for example, if its cross-section is the same throughout. Apart from the receiving and guiding function for the binder strand, the receiving section can also provide structural stabilization of the entire pipe profile.

A further embodiment of the present invention provides for the pipe profile to have a back section that is convex in cross-section at least in sections on the inside. The back section can be rounded or curved overall. The pipe profile is convex when viewed from the outside. The pipe profile can be described as being U-shaped in at least some embodiments. The pipe profile can be curved in the same direction as the opposite receiving section. Both sections can together form a kind of double U-profile.

The pipe profile may have two side sections opposite each other transverse to the plane of curvature, each of which extends at an angle of at most 15° to the plane of curvature. The angle can also be at most 10° or at most 7°. This means that the side sections run almost or exactly parallel to the plane of curvature and thus perpendicular to the swing axle. The side sections therefore stabilize the needle body against bending moments occurring around the swing axle. Such bending moments can occur during the sometimes highly dynamic guidance of the binder due to the inertia of the binder strand and due to the inertia of the binding needle itself. The side sections can in particular extend on both sides of the above-mentioned receiving section and/or the back section.

As already mentioned above, the needle body can advantageously be manufactured solely by forming (and possibly cutting) a semi-finished product. It is possible for the guide element to be manufactured in one piece with the needle body, for example, by further forming and separating the semi-finished product in an end region. This is also conceivable for the mounting element. It can, however, be technically complex to form the aforementioned elements using, for example, a steel tube as a semi-finished product. It can therefore be advantageous if the guide element and/or the mounting element are manufactured separately from the needle body and attached thereto. This means that the respective element is manufactured separately from the needle body, whereby a fundamentally different manufacturing process can be used than for the needle body. The element can, for example, be manufactured by primary forming, for example, by casting, whereby no or at least no significant forming or separating is necessary.

Although the needle body itself already has a high mechanical stability, it may be useful in some embodiments to further stabilize the binding needle. It may in particular be provided that the binding needle has at least one reinforcing element which is attached to the needle body and is arranged at least partially on the inside thereof. The at least one reinforcing element can extend along at least one third or at least half of the needle body. This statement refers to their total extension in the case of several reinforcing elements. The respective reinforcing element is arranged at least partially on the inside and can be connected to the inside of the pipe profile. The respective reinforcing element may, for example, be attached to the back section mentioned above. A plurality of reinforcing elements may also be provided, in particular two. These can, for example, be arranged successively along the direction of the pipe profile, whereby their positions may overlap. These reinforcing elements can in turn be connected to one another. The at least one reinforcing element can, for example, be made of metal, in particular of steel. The respective reinforcing element can, for example, extend at least partially at an angle of at most 15° to the plane of curvature or even parallel thereto. This alignment achieves stabilization against bending moments around the swing axle similar to that described above with regard to the side sections.

A reinforcing element can, for example, be designed as a flat sheet metal part. It is also possible, however, for at least one reinforcing element to have a profile. This means that the at least one reinforcing element can be designed as a profiled part which further improves its stabilizing effect. At least one reinforcing element can in particular have a U-profile. The stabilizing effect of the reinforcing element can also be improved by the fact that it is attached to the mounting element. The three elements are mutually stabilized if at least one reinforcing element is attached to both the needle body and to the mounting element.

The connections between the different elements can be provided in various ways. An at least partially positive connection can, for example, be used which can be provided using screws or rivets. Such connections can, however, lead to a punctual transmission of force which can be disadvantageous. Such connections also require a certain geometric arrangement and composition of the elements to be joined in order to be effective. For these and possibly other reasons, it may be advantageous if at least one reinforcing element, the guide element, and/or the mounting element is firmly bonded to the needle body. A connection between two reinforcing elements and/or a connection between a reinforcing element and the mounting element can also be firmly bonded. A firmly bonded connection can extend linearly or over an extensive area, which provides distributed force transmission, and can in principle be used for any contact areas between two elements. The firmly bonded connection can, for example, be made by gluing or soldering or welding. These and any other optional welded connections are, however, limited to a comparatively small area of the binding needle. They therefore only cause a relatively small amount of heat to be introduced and thus only result in minor thermal deformations.

The present invention further provides a bale press which is designed to form a crop bale in a bale chamber and to wrap the crop bale with a strand-shaped binder, the bale press comprising a needle yoke with a rocker support to which at least one binding needle according to the present invention is attached.

The above terms have already been explained with reference to the binding needle according to the present invention. Embodiments of the bale press according to the present invention correspond to those of the binding needle according to the present invention.

The present invention also provides a method for manufacturing a binding needle for a needle yoke of a bale press, wherein the binding needle has a mounting element for mounting on a rocker support of the needle yoke, a guide element for at least indirectly guiding a strand-shaped binder, and a needle body made of metal which extends from the mounting element to the guide element and runs at least in sections in an arch-like manner along a plane of curvature, thereby defining an inside of the arc and an outside of the arc of the binding needle.

The present invention provides that a pipe profile defining a profile interior is used to at least partially form the needle body. The above terms have already been explained with reference to the binding needle according to the present invention. Insofar as they are not explicitly mentioned below, embodiments of the method according to the present invention correspond to those of the binding needle according to the present invention.

As part of the process, it is possible for the pipe profile to already have the exact shape that is intended to (at least partially) form the needle body. An embodiment of the present invention provides, however, for the pipe profile to be formed. This means that a pipe profile is provided, for example, by original forming, which can be referred to as a blank or semi-finished product. This pipe profile is then formed to form at least part of the needle body. The cross-section and/or the direction of the pipe profile can in particular be changed by forming, for example, by cold forming of the pipe profile. This can in particular refer to a forming process that changes the cross-section and/or changes the direction of flow. In this context, “cold forming” refers to any forming that is carried out below the recrystallization temperature, which for steel is in particular below 600° C. The temperature can, however, be significantly lower, for example, below 150° C. or below 100° C. It can in particular be at room temperature, for example, between 10° C. and 30° C. If the pipe profile has a higher temperature during cold forming, this may be due to heating from a previous forming step. The temperature is normally below 100° C. even in such a case. Cold forming eliminates the need to heat the pipe profile which would significantly increase energy consumption. Cold forming above all leads to a work hardening of the pipe profile. This significantly improves the rigidity of the pipe profile. Hot forming cannot, however, in principle be ruled out. If hot forming is, however, carried out, it is advantageous to carry out tempering after the hot forming, i.e., a targeted, forced temperature change of the pipe profile which can influence the microstructure thereof.

Forming can be carried out to adjust the cross-section of the pipe profile, i.e., to change the cross-section. The cross-section can be changed along the entire length of the pipe profile or only along a part thereof. The pipe profile can in particular be rolled in order to adjust the cross-section of the pipe profile. The pipe profile can be passed between one or more pairs of driven forming rollers. Each pair of rollers has a specific profile, the negative of which is formed into the pipe profile. In the case of a number of pairs of rollers, the forming can be carried out in stages so that each individual forming step is less intensive. The cross-section can in particular be adjusted by cold forming, namely, by cold rolling.

Bending, in particular roll bending, of the pipe profile can, for example, be carried out to adjust the course of the pipe profile along the plane of curvature. The cross-section of the pipe profile is normally already fixed at the beginning of the bending process, either due to the original forming of the pipe profile or due to a previous forming, for example, the above-mentioned rolling. For example, the pipe profile is at this point straight, i.e., it has no curvature. Bending changes the course of the pipe profile so that the arch-like course along the plane of curvature is finally achieved. A constant curvature can be produced throughout the pipe profile, however, the curvature can also vary in certain areas. It is possible to adjust the curvature in one or more bending steps. Different bending methods can be used. Roll bending can, for example, be used. The pipe profile is bent by passing it between rotating rolls. Cold forming can, for example, be used for bending.

As already explained above, the guide element and the mounting element can, for example, be formed onto the needle body by forming processes. The guide elements can also be prefabricated separately. An embodiment of the method of the present invention provides that the guide element, the mounting element and/or at least one reinforcing element can, for example, be attached to the needle body, with the reinforcing element being arranged at least partially on the inside of the needle body. It can be advantageously attached via a firmly bonded connection, in particular by welding.

The present invention can be used for all known knotter systems, i.e., in particular for both single knotters and double knotters.

The present invention is described below with reference to the drawings. The drawings are thereby merely exemplary and in no way limit the general idea of the present invention.

FIG. 1 shows a side view of a sectional view of a bale press 1 according to the present invention, more specifically a square baler. Here and in the other drawings, a longitudinal axis X, a transverse axis Y, and a vertical axis Z are shown pointing backwards against a direction of travel. The illustration is simplified and various components that are not relevant for understanding the present invention have been omitted. The bale press 1 has a main frame 2 which is supported on the ground via a chassis 3 and which is connected to a drawbar 4, via which the bale press 1 can be coupled to a towing vehicle. The present invention is expressly not limited to towed or carried bale presses, but also relates to self-propelled bale presses and stationary bale presses. A bale chamber 9 is defined within the main frame 2. The crop is picked up from the ground via a pick-up 5 and, in the case of the bale press 1 shown here, is fed further via a cutting rotor 6 (which can alternatively also be designed as a conveyor rotor or which can also be omitted) and a conveyor 7 to the bale chamber 9, in which a square crop bale 50 (shown schematically in FIG. 1) is successively built up from portions of crop material. The crop is compacted in the bale chamber 9 by an oscillating bailing ram 10.

When the square crop bale 50 has reached its predetermined size, it is bound together via a binder 40, for example, a thermoplastic tape or yarn. A plurality (for example, six) of loops of binder 40 are placed around the square crop bale 50. To form the respective loop, a strand section of a binder strand is connected to a second strand section which is guided for this purpose from below through the bale chamber 9 and further to its upper side. This is performed via binding needles 20 which are part of a needle yoke 15. In a manner not explained in detail here, the needle yoke 15 is driven pivotably about a swing axle S which runs parallel to the transverse axis Y. Each binding needle 20 is attached to a common rocker support 16 of the needle yoke 15, which is in turn connected to the swing axle S via two rocker arms 17. As described, the binding needle 20 guides a binder strand which is only partially shown in FIG. 1 and which can be gradually unwound from a supply roll (which is not shown). The details of the binding process are known from the state of the art and will not be explained further.

Figure 2:
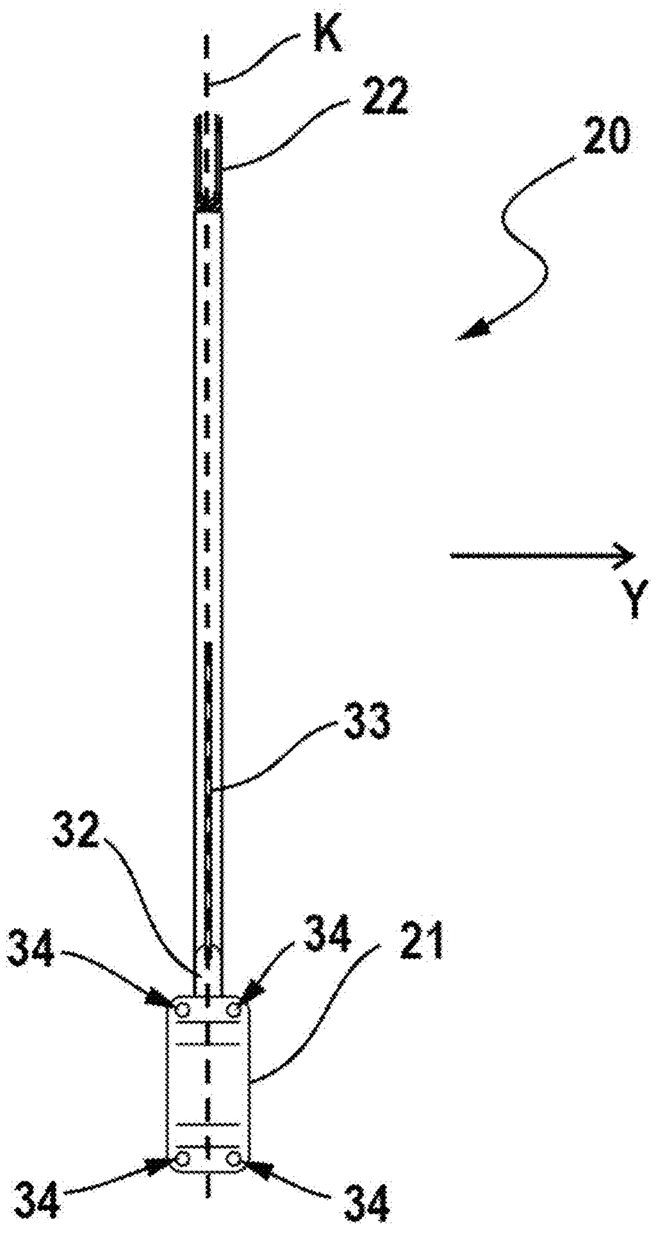
FIG. 2 shows a first view of a binding needle according to the present invention looking within the longitudinal plane of the bale press and thus perpendicular to a transverse axis.
Figure 3:
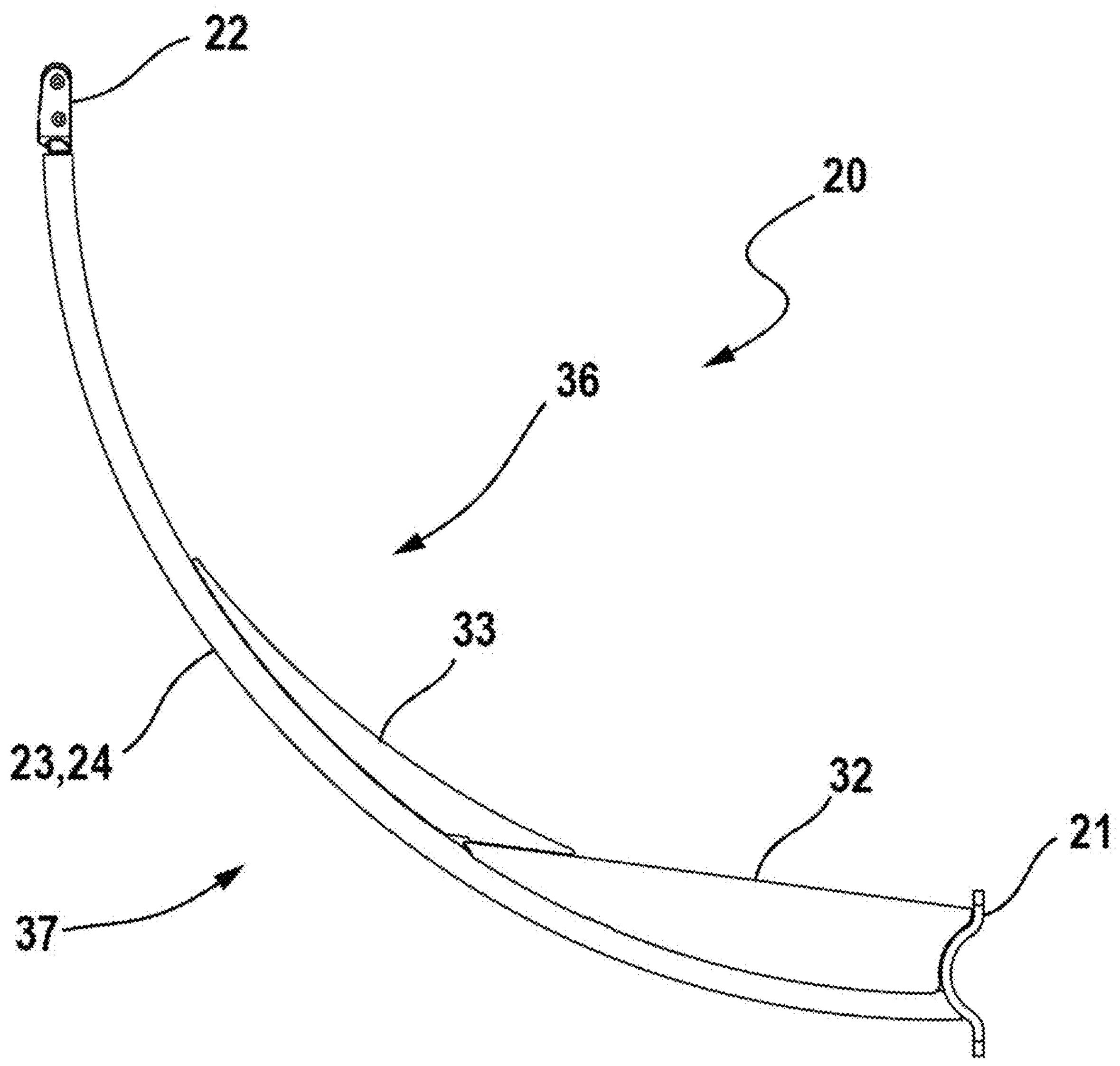
FIG. 3 shows a second view of the binding needle according to the present invention with the viewing direction being parallel to the transverse axis.
Figure 4:
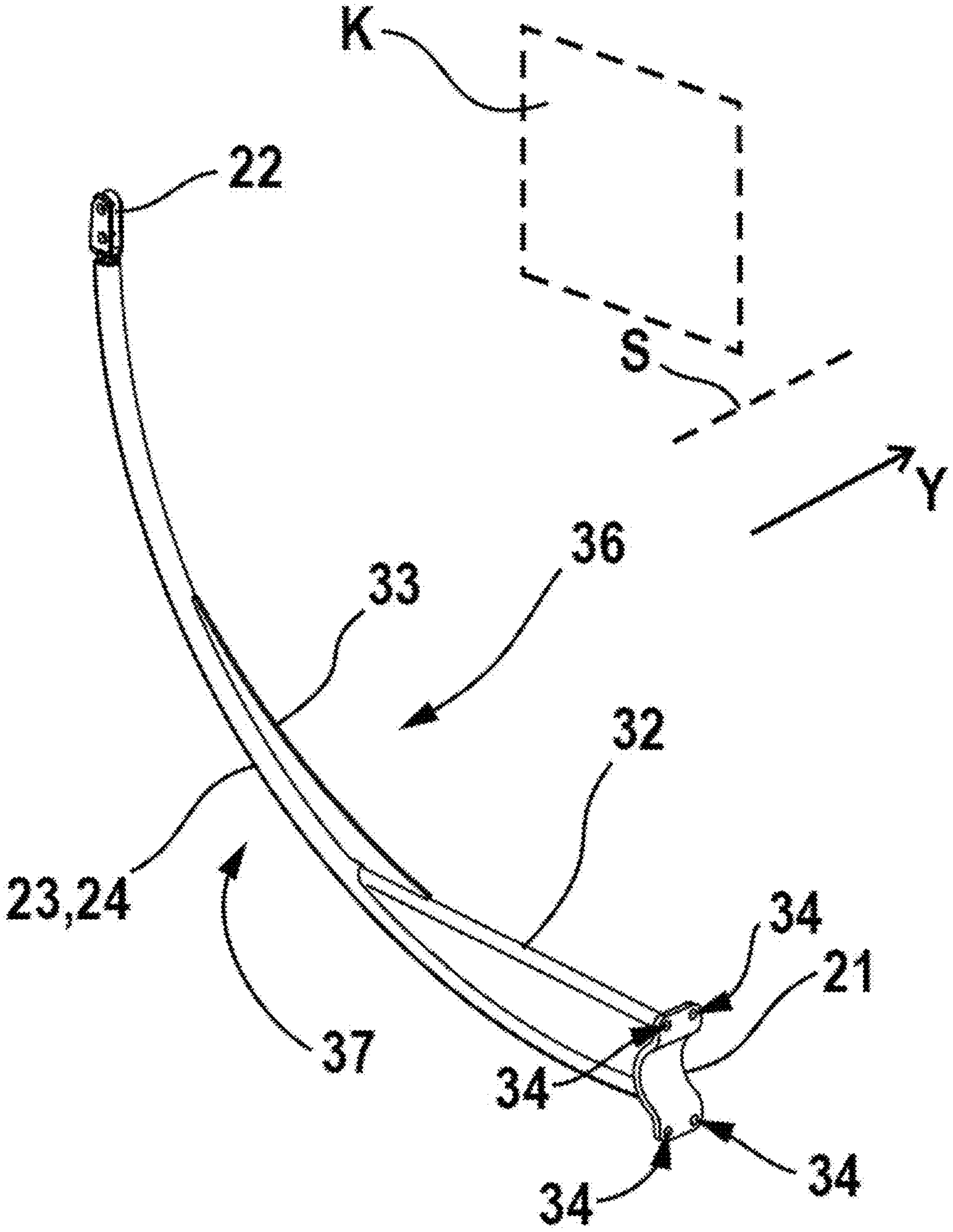
FIG. 4 shows a third view of the binding needle according to the present invention in a perspective view.
Figure 5:
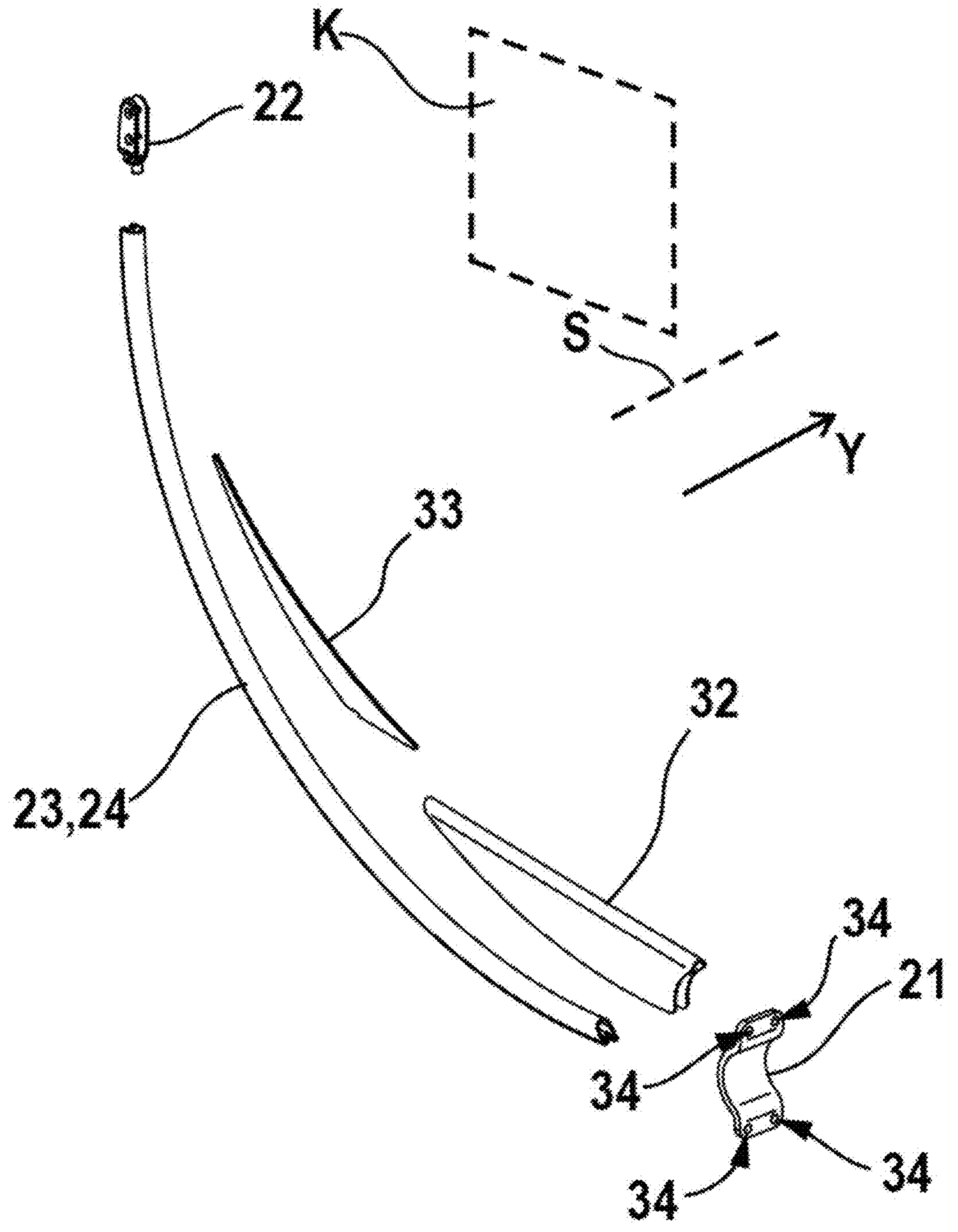
FIG. 5 shows an exploded view of the binding needle from FIGS. 2-4.

FIGS. 2 to 4 show a single binding needle 20, with FIG. 2 showing a view looking within the longitudinal plane of the bale press 1 and thus perpendicular to the transverse axle Y. FIG. 3 is a view with the viewing direction parallel to the transverse axle Y and FIG. 4 is a perspective view. FIG. 5 is an exploded view showing various individual parts of the binding needle 20. The binding needle 20 has a mounting element 21, which can also be referred to as a needle foot, and is made of sheet steel. The mounting element 21 serves to be attached to the rocker support 16 and thus to secure the binding needle 20 as a whole. To enable fastening, four through-holes 34 are provided in this case, through which screws can be passed. At an end opposite the mounting element 21, the binding needle 20 has a guide element 22 which can serve as a roll holder for a guide roll, via which the binder strand is guided. The guide element 22 in this example is cast in one piece from steel. The mounting element 21 and the guide element 22 are connected by a needle body 23 which extends in an arch-like manner along a plane of curvature K. This defines an inside 36 on the inside of the arc and an outside 37 on the outside of the arc. The curvature of the needle body 23 in this example is constant along its entire length, i.e., its course corresponds to a circular arc. The needle body 23 is made of a pipe profile 24 which is made of steel, which defines a profile interior 35 (visible in FIG. 6), i.e., encloses it circumferentially. The guide element 22 is welded to the needle body 23, whereby it partially engages in the profile interior 35. The mounting element 21 is welded to the needle body 23, both the mounting element 21 and the needle body 23 being additionally welded to a first reinforcing element 32. The first reinforcing element 32 is made of sheet steel and has a U-profile. The first reinforcing element 32 is arranged on the inside 36 of the needle body 23. A second reinforcing element 33, which is formed as a flat sheet steel, is also welded to the inside 36 of the needle body 23 and to the first reinforcing element 32. The reinforcing elements 32, 33 are cut so that their shape matches that of the needle body 23 and the mounting element 21.

Figure 8:
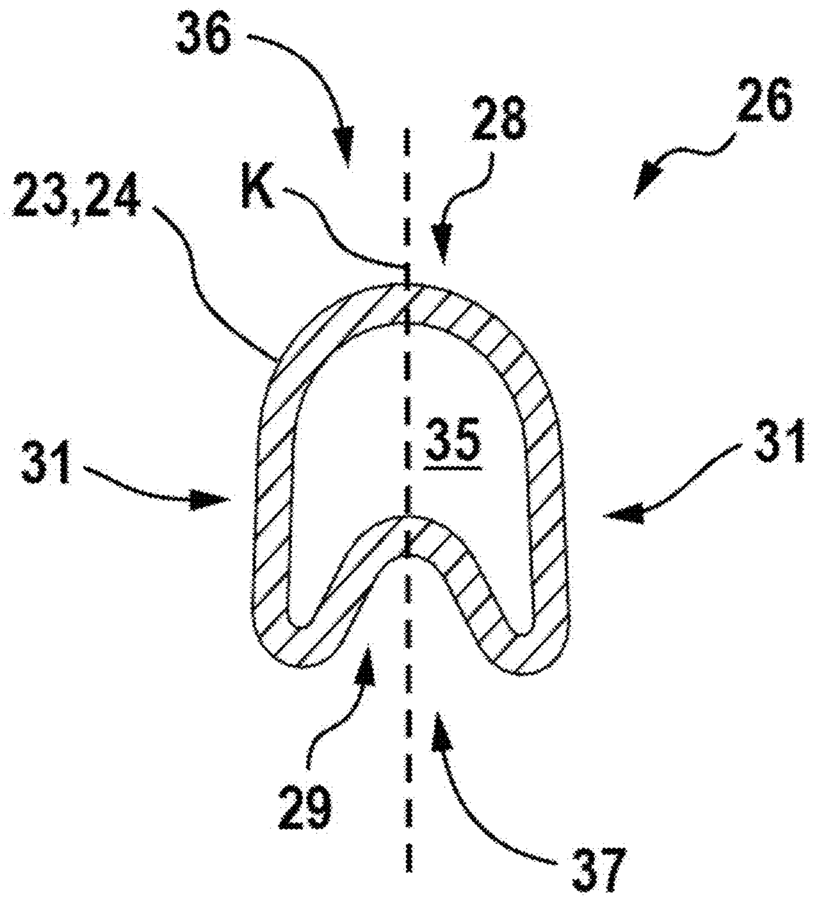
FIG. 8 shows a sectional view of the needle body.
Figure 9:
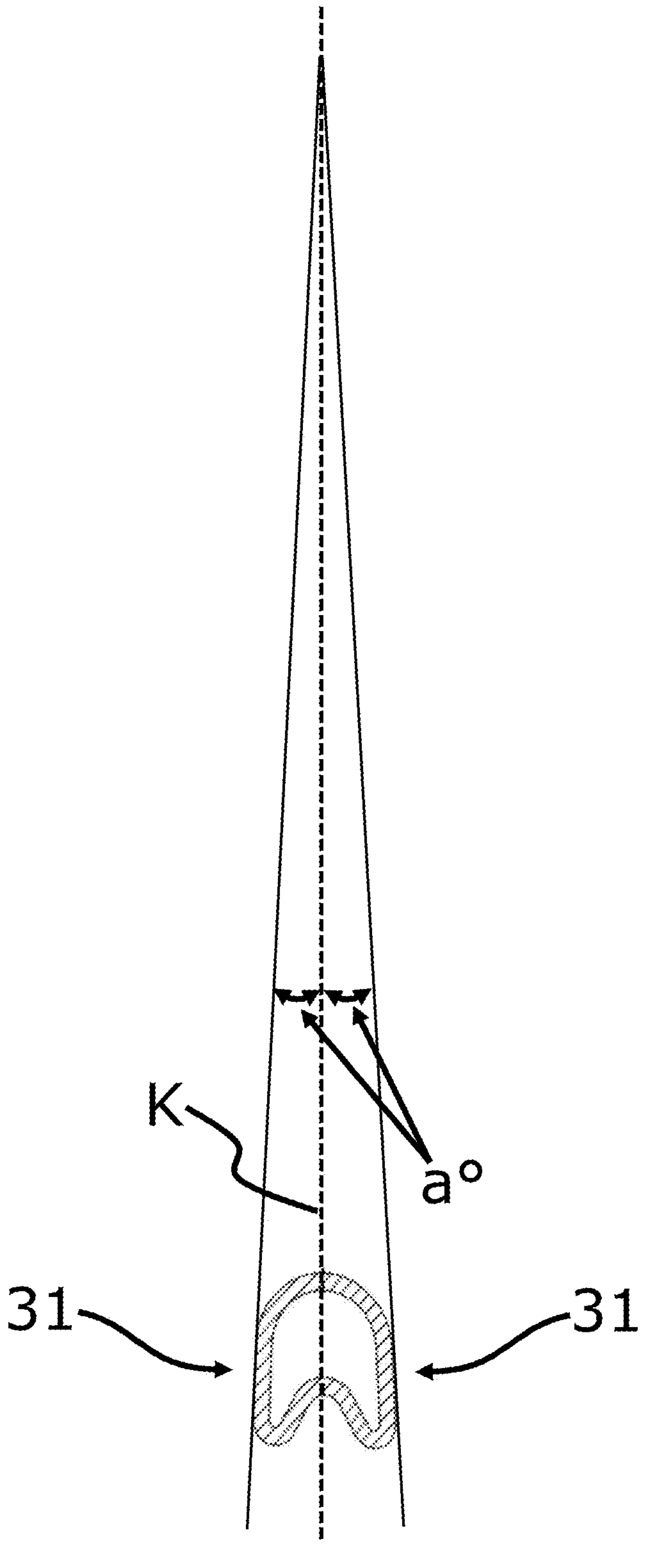
FIG. 9 shows a smaller view of the sectional view of the needle body as in FIG. 8 which shows the angle between the plane of curvature and each of the two side sections.

The pipe profile 24 of the needle body 23, the cross-section 26 of which is shown in FIG. 8, has a receiving section 29 on the outside 37 which is concave in cross-section. The receiving section 29 forms a receiving trough 30 in which a strand section of the binder 40 can be temporarily received. A convex back section 28 is formed on the opposite inside 36. The back section 28 and the receiving section 29 form a double U-profile which contributes to the structural stabilization of the needle body 23. The back section 28 and the receiving section 29 are connected by two side sections 31 which lie opposite each other transversely to the plane of curvature K and, in this example, are inclined by an angle a° of approximately 5° relative to the plane of curvature K as is shown in FIG. 9. The back section 28 and the receiving section 29 above all have the effect of stabilizing the needle body 23 against bending moments around the swing axle S.

Figure 6:
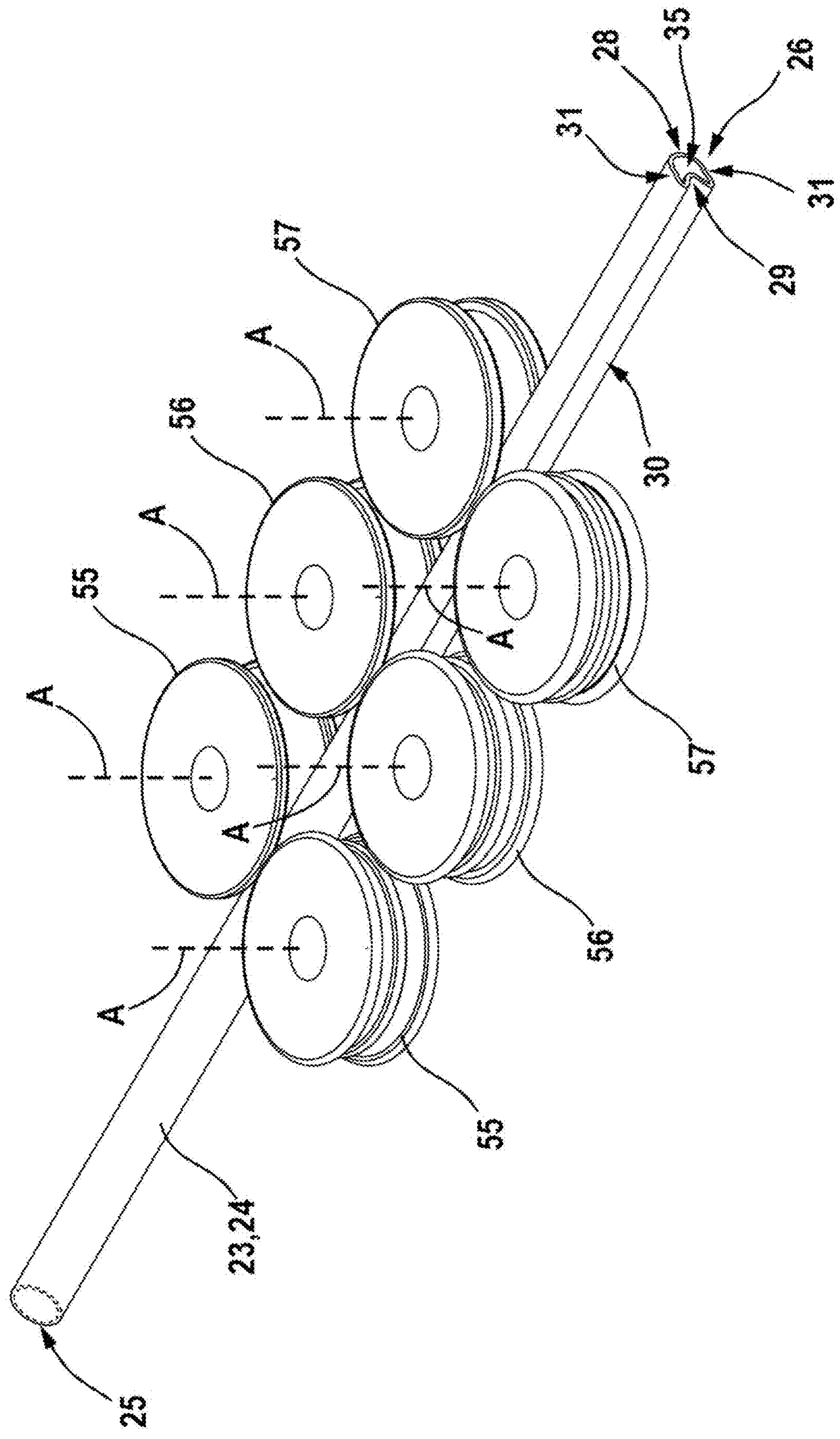
FIG. 6 shows a perspective view of a roll forming device with a needle body of the binding needle.

The pipe profile 24 is made of a one-piece semi-finished product, which initially has a circular cross-section 25 and is rectilinear. The semi-finished product could alternatively initially also have a different, for example, a quadrangular, in particular rectangular or square cross-section. This semi-finished product is processed by cold forming, whereby in a first processing step, as shown in FIG. 6, the pipe profile 24 is rolled in order to adjust the cross-section 26. In this example embodiment, the pipe profile 24 passes successively through a pair of first rollers 55, a pair of second rollers 56, and a pair of third rollers 57, each of which is rotatable about roller axes A which are parallel to one another. More or less than three pairs of rollers could alternatively be used. Between each pair of rollers 55, 56, 57, the profiled lateral surface of the respective roller 55, 56, 57 causes a gradual forming of the pipe profile 24, whereby the circular cross-section 25 gradually changes into the cross-section 26 shown in FIG. 8. The forming is carried out as cold forming at room temperature, although each forming step leads to a certain heating of the pipe profile 24. The temperature in the third forming step is nevertheless also well below the recrystallization temperature. Work hardening occurs due to the cold forming which further improves the stiffness of the pipe profile 24.

Figure 7:
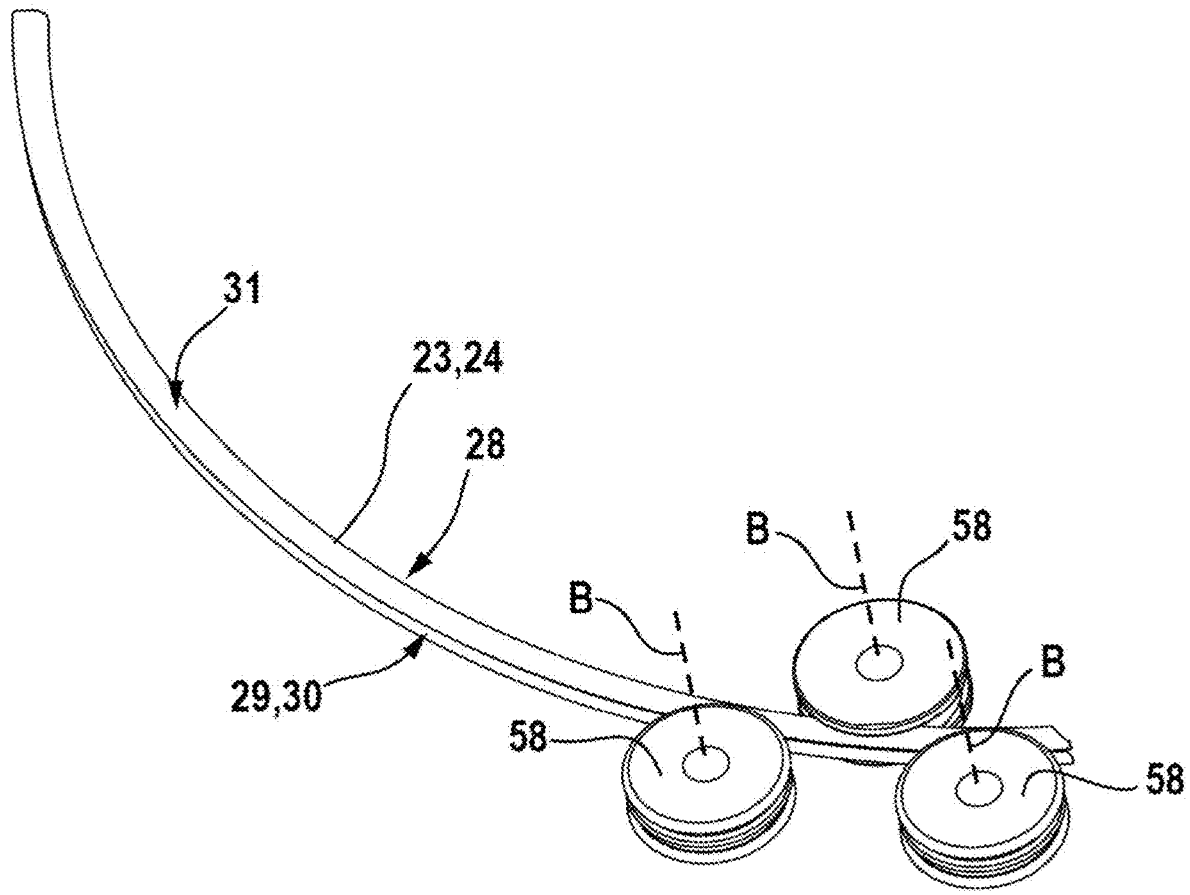
FIG. 7 shows a perspective view of a roll bending device with the needle body.

In a further processing step which is shown in FIG. 7, the pipe profile 24 is roll-bent. The pipe profile 24 is thereby guided between three rolls 58 which are rotatable about roll axes B. The three rolls 58 are offset from each other so that a curvature is impressed on the pipe profile 24. The curvature can be set in a single forming step. It would alternatively also be possible to adjust this in several steps, whereby the offset of the rolls 58 is changed in each case, resulting in a stronger curvature. The lateral surfaces of the rolls 58 are adapted so that the previously set cross-section 26 is not changed or is only changed insignificantly. Roll bending is also carried out as cold forming so that the previously achieved work hardening is retained and normally reinforced.

It is alternatively also possible to carry out the rolling of the pipe profile 24 and the roll bending in a combined production step, for example, so that the pipe profile 24 passes through the rollers 55, 56, 57 and the rolls 58 in immediate succession.

The present invention is not limited to embodiments described herein; reference should be had to the appended claims.

LIST OF REFERENCE CHARACTERS

1 bale press
2 main frame

3 chassis
4 drawbar
5 pick-up
6 cutting rotor
7 conveyor
9 bale chamber
10 bailing ram
15 needle yoke
16 rocker support
17 rocker arm
20 binding needle
21 mounting element
22 guide element
23 needle body
24 pipe profile
25 circular cross-section
26 cross-section
28 back section
29 receiving section
30 receiving trough
31 side section
32 first reinforcing element
33 second reinforcing element
34 through-hole
35 profile interior
36 inside
37 outside
40 binder
50 square crop bale
55 pair of first rollers
56 pair of second rollers
57 pair of third rollers
58 rolls
a° Angle between the plane of curvature and each of the two side sections
A roller axis
B roll axis
K plane of curvature
S swing axle
X longitudinal axis
Y transverse axis
Z vertical axis

What is claimed is:

1. A binding needle for a needle yoke of a bale press, the binding needle comprising:

a mounting element which is configured to mount to a rocker support of the needle yoke;

a guide element which is configured to at least indirectly guide a strand-shaped binder; and a needle body which is made of a metal, the needle body being formed entirely by a pipe profile which defines a profile interior, the needle body being arranged to extend from the mounting element to the guide element and to run at least in sections in a manner of an arc along a plane of curvature so as to define an inside of the arc of the binding needle and an outside of the arc of the binding needle, wherein the pipe profile is a solid-wall pipe profile which defines a fully enclosed pipe interior along a length thereof.

2. The binding needle as recited in claim 1, wherein the pipe profile comprises, at least in sections on the outside of the arc, a receiving section which has a concave cross-section and which defines an outside receiving trough for the strand-shaped binder.

3. The binding needle as recited in claim 1, wherein the pipe profile comprises, at least in sections on the inside of the arc, a back section which has a convex cross-section.

4. The binding needle as recited in claim 1, wherein the pipe profile comprises two side sections which are arranged to lie opposite to one another transversely to the plane of curvature, each of the two side sections being arranged to run at an angle of at most 15° to the plane of curvature.

5. The binding needle as recited in claim 1, wherein at least one of the guide element and the mounting element are manufactured separately from the needle body and are mounted thereto.

6. The binding needle as recited in claim 1, further comprising:

at least one reinforcing element which is mounted to the needle body and which is arranged at least partially on the inside of the arc.

7. The binding needle as recited in claim 6, wherein at least one of the at least one reinforcing element is designed as a profile part and/or is attached to the mounting element.

8. The binding needle as recited in claim 6, wherein at least one of the at least one reinforcing element, the guide element, and the mounting element is/are firmly bonded to the needle body.

9. A bale press which is configured to form a crop bale in a bale chamber and to wrap the crop bale with a strand-shaped binder, the bale press comprising:

a needle yoke comprising a rocker support; and the at least one binding needle as recited in claim 1, wherein, the at least one binding needle is attached to the rocker support.

10. A method for producing a binding needle for a needle yoke of a bale press, wherein the binding needle comprises:

a mounting element which is configured to mount to a rocker support of the needle yoke;

a guide element which is configured to at least indirectly guide a strand-shaped binder; and a needle body which is made of a metal, the needle body being arranged to extend from the mounting element to the guide element and to run at least in sections in a manner of an arc along a plane of curvature so as to define an inside of the arc of the binding needle and an outside of the arc of the binding needle, and the method comprises:

using a pipe profile which defines a profile interior to form the needle body, wherein, the needle body is formed entirely by the pipe profile, and the pipe profile is a solid-wall pipe profile which defines a fully enclosed pipe interior along a length thereof.

11. The method as recited in claim 10, wherein the using of the pipe profile to form the needle body is performed via a forming of the pipe profile.

12. The method as recited in claim 11, wherein the forming of the pipe profile is a cold forming.

13. The method as recited in claim 11, further comprising:

performing a rolling of the pipe profile to adjust a cross-section of the pipe profile.

14. The method as recited in claim 13, further comprising:

performing a bending of the pipe profile to adjust a course of the pipe profile along the plane of curvature.

15. The method as recited in claim 14, wherein the bending of the pipe profile is a roll bending.

16. The method as recited in claim 10, further comprising:

attaching at least one of the guide element, the mounting element, and at least one reinforcing element to the needle body, wherein, if the at least one reinforcing element is attached to the needle body, the at least one reinforcing element is arranged at least partially on the inside of the arc.

17. A binding needle for a needle yoke of a bale press, the binding needle comprising:

a mounting element which is configured to mount to a rocker support of the needle yoke;

a guide element which is configured to at least indirectly guide a strand-shaped binder; and a needle body which is made of a metal, the needle body being formed entirely by a pipe profile which defines a profile interior, the needle body being arranged to extend from the mounting element to the guide element and to run at least in sections in a manner of an arc along a plane of curvature so as to define an inside of the arc of the binding needle and an outside of the arc of the binding needle, wherein, the pipe profile is a solid-wall pipe profile which defines a fully enclosed pipe interior along a length thereof, and the pipe profile comprises, at least in sections on the outside of the arc, a receiving section which has a concave cross-section and which defines an outside receiving trough for the strand-shaped binder.

* * * * *